Jan. 21, 1958  C. A. AMANN  2,820,341
BRAKING AND REVERSE TURBINE FOR GAS TURBINE ENGINES
Filed Oct. 28, 1954
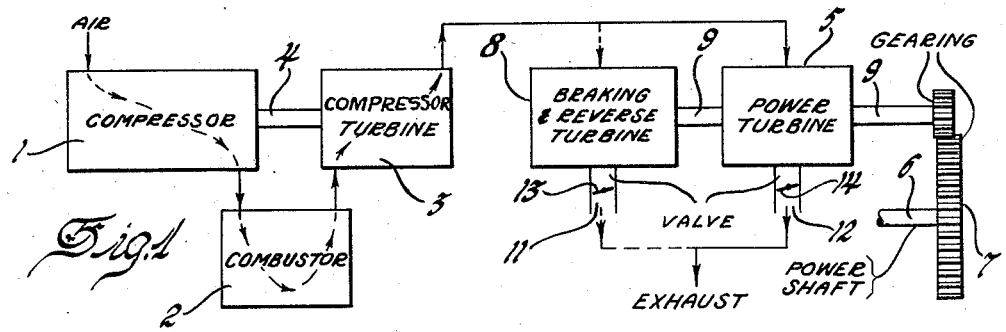
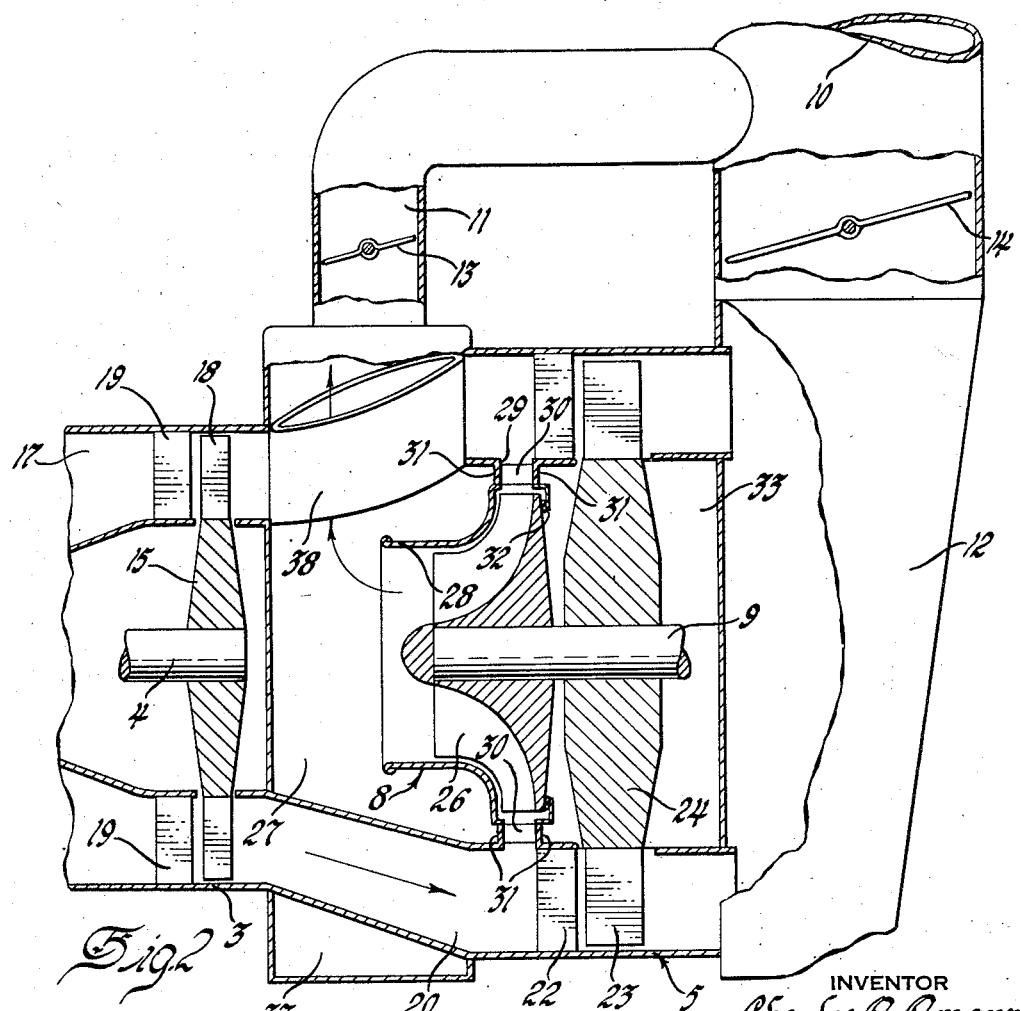
INVENTOR
Charles A. Amann
BY
Paul Fitzpatrick
ATTORNEY United States Patent Office 2,820,341
Patented Jan. 21, 1958

2,820,341

BRAKING AND REVERSE TURBINE FOR GAS TURBINE ENGINES

Charles A. Amann, Birmingham, Mich., assignor to General Motors Corporation, Detroit, Mich., a corporation of Delaware Application October 28, 1954, Serial No. 465,237

5 Claims. (Cl. 60—39.15)

This invention relates to a braking and reverse turbine for a gas turbine engine and more particularly to a gas turbine engine for vehicular use which includes a braking and reverse turbine.

In gas turbine engines of known type, the power turbine is connected through suitable gearing to the load, which would be the drive wheels in a roadable vehicle. This arrangement yields output torque characteristics which are very good for vehicular use, but the engine has no significant braking power during deceleration and the gearing must normally include a reverse gear in order to reverse the direction of movement of the vehicle. This invention overcomes these difficulties by the utilization of a braking and reverse turbine.

In the preferred embodiment of the invention, described in detail herein, the braking and reverse turbine is mounted on the same shaft as the power turbine and has blading which delivers a torque opposite to that required for forward motion of the vehicle. The flow of motive fluid through the braking and reverse turbine is restricted or prevented during normal forward motion of the vehicle. However, during deceleration of the vehicle, motive fluid is allowed to flow through the braking and reverse turbine to hasten deceleration by providing a torque opposing the forward motion of the vehicle. The rate of deceleration is controlled by controlling the flow through the braking and reverse turbine. If it is desired to reverse the direction of movement of the vehicle, substantially all of the motive fluid is channeled through the braking and reverse turbine causing the vehicle to reverse its direction of movement without requiring a reverse gear.

An object of this invention is to provide a gas turbine for vehicular use having braking power during deceleration of the vehicle. Another object of this invention is to provide a gas turbine for vehicular use which will drive the vehicle in forward and reverse directions of movement through the same gearing without requiring reverse gearing for reverse directions of movement. A more specific object of this invention is to provide a gas turbine for vehicular use utilizing a braking and reverse turbine for braking power during deceleration of the vehicle and for driving the vehicle in reverse directions of movement without requiring reverse gearing.

These and other objects of this invention will be readily apparent from the following specification and drawings, in which:

Figure 1 is a schematic diagram of a gas turbine for vehicular use; and

Figure 2 is a sectional view of a braking and reverse turbine installation in a gas turbine for vehicular use.

Referring now to Figure 1 of the drawings, a gas turbine for vehicular use will be described. Air enters compressor 1 from which it passes to a combustor 2. Heat is added to the compressed air in the combustor by the combustion of fuel and the resultant products of combustion, hereinafter referred to as motive fluid, then pass to a compressor turbine 3. The compressor turbine is mechanically coupled to compressor 1 by shaft 4. The motive fluid is expanded through the compressor turbine where enough energy is extracted to drive the compressor, and then the motive fluid is discharged to the power turbine 5. The power turbine is mechanically independent of the compressor turbine and the compressor, and is connected to the output shaft 6 through turbine shaft 9 and suitable gearing 7. The output shaft is connected to the driving wheels of the vehicle.

A braking and reverse turbine 8 is mounted on the same shaft 9 as the power turbine but has blading which delivers a torque of opposite sense to that required for forward movement of the vehicle. The braking and reverse turbine 8 and the power turbine 5 are connected to the exhaust duct 10 by passages 11 and 12. Valves 13 and 14 located in passages 11 and 12, respectively, control the flow of motive fluid to the exhaust duct.

During normal forward operation of the vehicle, the flow of motive fluid through the braking and reverse turbine is restricted or prevented by closing valve 13. However, during deceleration of the vehicle, valve 13 is opened to permit the flow of motive fluid through the braking and reverse turbine to produce a torque which opposes forward movement of the vehicle. For faster deceleration of the vehicle, valve 14 may be closed or partially closed so that a greater fraction of the flow of the motive fluid passes through the braking and reverse turbine. If it is desired to reverse the direction of movement of the vehicle or obtain maximum braking, valve 14 is closed and valve 13 is opened so that all of the motive fluid passes through the braking and reverse turbine and causes the vehicle to reverse its direction of movement without requiring a reverse gear in gearing 7.

Valves 13 and 14 are selectively operable by the operator of the vehicle and the degree of closure of the valves determines the rate of deceleration of the vehicle and also the direction of movement of the vehicle.

Figure 2 shows the installation of the braking and reverse turbine and the power turbine. The compressor turbine 3 includes a turbine wheel 15 mechanically coupled to the compressor 1 by shaft 4. The motive fluid is discharged from the combustor 2 through outlets 17 and is directed against the buckets 18 of the compressor turbine by an annular row of stator vanes 19. After enough energy has been extracted from the motive fluid to drive the compressor, the motive fluid is discharged into an annular transition duct 20. A nozzle ring 22 directs the motive fluid against the buckets 23 of the power turbine wheel 24 which is mounted on shaft 9. The turbine wheel 26 of the braking and reverse turbine 8 is mounted on shaft 9 forward of the power turbine and extends partially within chamber 27 inside annular duct 20. A shroud 28 is provided within chamber 27 around turbine wheel 26. A circumferential opening 29 is provided in the inner wall of the transition duct 20 and a series of stator vanes 30 are mounted within this opening to direct the flow of the motive fluid against the blading of the braking and reverse turbine wheel 26. The shroud 28 is supported by the walls 31 of opening 29 and is provided with an annular seal 32 to seal the braking and reverse turbine 8 and chamber 27 from the power turbine chamber 33.

The main exhaust duct 10 receives the motive fluid discharged from the power turbine through an exhaust collector 12. The annular transition duct 20 is surrounded by an annular chamber 37 which receives the motive fluid discharged from the braking and reverse turbine. Chamber 37 is connected to chamber 27 by a number of streamlined hollow radial struts 38 which extend across duct 20. Chamber 37 is connected to the exhaust duct 10 by passage 11. Valves 13 and 14 are mounted within branch passage 11 and the main exhaust duct 10, respectively, and control the flow of motive fluid from the braking and reverse turbine and power turbine. Valve 14 is located upstream from the entry of passage 11 into the main exhaust duct.

For normal forward operation of the vehicle, valve 13 is closed and valve 14 is opened to channel all of the motive fluid discharged from the compressor turbine 3 through power turbine buckets 23. To decelerate the vehicle, valve 13 is partially opened and valve 14 may be partially closed so that a fraction of the motive fluid is channeled into opening 29 and is directed against the blading of the braking and reverse turbine wheel 26 by stator vanes 30. For a faster rate of deceleration of the vehicle, valve 14 will be substantially closed and valve 13 will be substantially open so that a greater fraction of the flow of the motive fluid is channeled through the braking and reverse turbine. If it is desired to reverse the direction of movement of the vehicle, valve 14 is closed and valve 13 is opened so that all of the flow of the motive fluid passes through the braking and reverse turbine.

The temperature of the motive fluid in passage 11 and exhaust collector 12 is less than that in annulus 20. By placing the valves 13 and 14 in the exhaust system, advantage is taken of this temperature differential to prolong valve life.

Although a specific embodiment of this invention has been shown and described, various changes and modifications may be made within the scope and spirit of the invention.

I claim:

1. A power plant comprising a gas generator furnishing motive fluid, an axial flow forward turbine driven by said motive fluid, an annulus conveying motive fluid from said gas generator to said forward turbine, a radial inflow reverse turbine mechanically coupled to said forward turbine and extending within the opening of said annulus, passage means extending from said annulus to said reverse turbine conveying motive fluid to drive said reverse turbine, an exhaust duct receiving motive fluid from said forward turbine and said reverse turbine, and valve means controlling the flow of motive fluid from said turbines to said duct.

2. A power plant comprising a gas generator furnishing motive fluid, a forward turbine driven by said motive fluid, an annulus conveying motive fluid from said gas generator to said forward turbine, a radial inflow reverse turbine mechanically coupled to said forward turbine and extending within the opening of said annulus, radial inflow passage means extending from said annulus to said reverse turbine conveying motive fluid to drive said reverse turbine, and exhaust duct receiving motive fluid from said forward turbine and said reverse turbine, radial outflow passage means extending across said annulus from said reverse turbine to said exhaust duct, and valve means controlling the flow of motive fluid from said turbines to said exhaust duct.

3. A power plant comprising a gas generator furnishing motive fluid, a forward turbine driven by said motive fluid, an entrance annulus conveying motive fluid from said gas generator to said forward turbine, a radial inflow reverse turbine mechanically coupled to said forward turbine and extending within the opening of said annulus, radial inflow passage means extending from said annulus to said reverse turbine for conveying motive fluid to drive said reverse turbine, outer annulus means surrounding said entrance annulus means for receiving motive fluid from said reverse turbine, an exhaust duct receiving motive fluid from said forward turbine and said outer annulus, and valve means controlling the flow of motive fluid from said turbines to said exhaust duct.

4. A power plant comprising a gas generator furnishing motive fluid, a forward turbine driven by said motive fluid, an annulus conveying motive fluid from said gas generator to said forward turbine, a radial inflow reverse turbine mechanically coupled to said forward turbine and extending within the opening of said annulus, radial inflow passage means extending from said annulus to said reverse turbine for conveying motive fluid to drive said reverse turbine, a number of passages of streamline shape extending across said annulus for receiving motive fluid from said reverse turbine, an exhaust duct receiving motive fluid from said forward turbine and said number of passages of streamline shape, and valve means controlling the flow of motive fluid from said turbines to said exhaust duct.

5. A power plant comprising a gas generator furnishing motive fluid, an axial flow forward turbine driven by said motive fluid, an annulus conveying motive fluid from said gas generator to said forward turbine, a radial inflow reverse turbine mechanically coupled to said forward turbine and extending within the opening of said annulus, radial inflow passage means extending from said annulus to said reverse turbine for conveying motive fluid to drive said reverse turbine, an outer annulus surrounding said entrance annulus, a member of passages of streamline shape extending across said entrance annulus to said outer annulus for conveying motive fluid from said reverse turbine, an exhaust duct receiving motive fluid from said forward turbine and said outer annulus, and valve means controlling the flow of motive fluid from said turbines to said duct.

References Cited in the file of this patent

UNITED STATES PATENTS

| | | |
|---|---|---|
| 2,303,295 | Allen | Nov. 24, 1942 |
| 2,529,773 | Johansson | Nov. 14, 1950 |

FOREIGN PATENTS

| | | |
|---|---|---|
| 627,959 | Great Britain | Aug. 18, 1949 |